(12) United States Patent
Benthien et al.

(10) Patent No.: US 11,518,488 B2
(45) Date of Patent: Dec. 6, 2022

(54) REINFORCING ELEMENT FOR A STRUCTURAL PROFILE, STRUCTURAL ARRANGEMENT, AIRCRAFT OR SPACECRAFT AND METHOD FOR PRODUCING A STRUCTURAL ARRANGEMENT

(71) Applicant: Airbus Operations GmbH, Hamburg (DE)

(72) Inventors: Hermann Benthien, Hamburg (DE); Axel Soeffker, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 444 days.

(21) Appl. No.: 16/579,999

(22) Filed: Sep. 24, 2019

(65) Prior Publication Data
US 2020/0122815 A1    Apr. 23, 2020

(30) Foreign Application Priority Data

Oct. 22, 2018    (DE) .......................... 102018218039.3

(51) Int. Cl.
| | |
|---|---|
| *F16L 9/04* | (2006.01) |
| *B64C 1/00* | (2006.01) |
| *B64G 1/22* | (2006.01) |
| *B32B 1/08* | (2006.01) |

(Continued)

(52) U.S. Cl.
CPC .................. *B64C 1/00* (2013.01); *B32B 1/08* (2013.01); *B32B 5/12* (2013.01); *B64G 1/22* (2013.01);

(Continued)

(58) Field of Classification Search
CPC .......... B29C 70/00; F16L 57/00; F16L 57/02; F16L 57/06; F16L 9/04; F16L 9/042

(Continued)

(56) References Cited

U.S. PATENT DOCUMENTS

| | | | |
|---|---|---|---|
| 3,669,157 A | * | 6/1972 | Woodall, Jr ........ B29C 61/0658 28/142 |
| 3,712,502 A | | 1/1973 | Basier et al. |

(Continued)

FOREIGN PATENT DOCUMENTS

| | | |
|---|---|---|
| DE | 1975462 U | 12/1967 |
| DE | 1504896 A | 9/1969 |

(Continued)

OTHER PUBLICATIONS

German Search Report; priority document.

*Primary Examiner* — Patrick F Brinson
(74) *Attorney, Agent, or Firm* — Greer, Burns & Crain, Ltd.

(57) ABSTRACT

A reinforcing element for a structural profile, in particular for a round, oval or elliptical structural tube. The reinforcing element comprises: a fiber structure which has a hollow-cylindrical, helically wound mesh of fiber strands and forms an inner shell surface formed to receive the structural profile; and a matrix material into which the fiber strands are respectively embedded and which is formed to be shrinkable by heating so that the fiber structure can be fastened to the structural profile with the inner shell surface by heating the matrix material. Also provided are a structural arrangement with such a reinforcing element, an aircraft or spacecraft with such a structural arrangement, as well as a method for producing such a structural arrangement.

17 Claims, 5 Drawing Sheets

(51) Int. Cl.
*B32B 5/12* (2006.01)
*B64C 1/06* (2006.01)
*F16L 57/00* (2006.01)

(52) U.S. Cl.
CPC ..... *B32B 2260/021* (2013.01); *B32B 2605/18* (2013.01); *B64C 1/06* (2013.01); *B64C 2001/0054* (2013.01); *F16L 9/04* (2013.01); *F16L 9/042* (2013.01); *F16L 57/00* (2013.01)

(58) Field of Classification Search
USPC .................................................. 138/110, 172
See application file for complete search history.

(56) References Cited

U.S. PATENT DOCUMENTS

| | | | |
|---|---|---|---|
| 4,155,792 A | | 5/1979 | Gelhaar et al. |
| 8,522,827 B2* | | 9/2013 | Lazzara .............. F16L 58/1063 |
| | | | 138/172 |
| 2008/0053554 A1* | | 3/2008 | Salama ................... F16L 9/147 |
| | | | 138/DIG. 2 |
| 2016/0039184 A1* | | 2/2016 | Tailor ..................... B32B 5/142 |
| | | | 428/343 |
| 2018/0169933 A1* | | 6/2018 | LaPorte .............. B29C 61/0616 |

FOREIGN PATENT DOCUMENTS

| | | |
|---|---|---|
| DE | 2641114 A1 | 3/1978 |
| DE | 69108397 T2 | 11/1995 |
| DE | 102008041230 A1 | 2/2010 |
| DE | 102010062682 A1 | 6/2012 |
| WO | 2013083842 A1 | 6/2013 |

\* cited by examiner

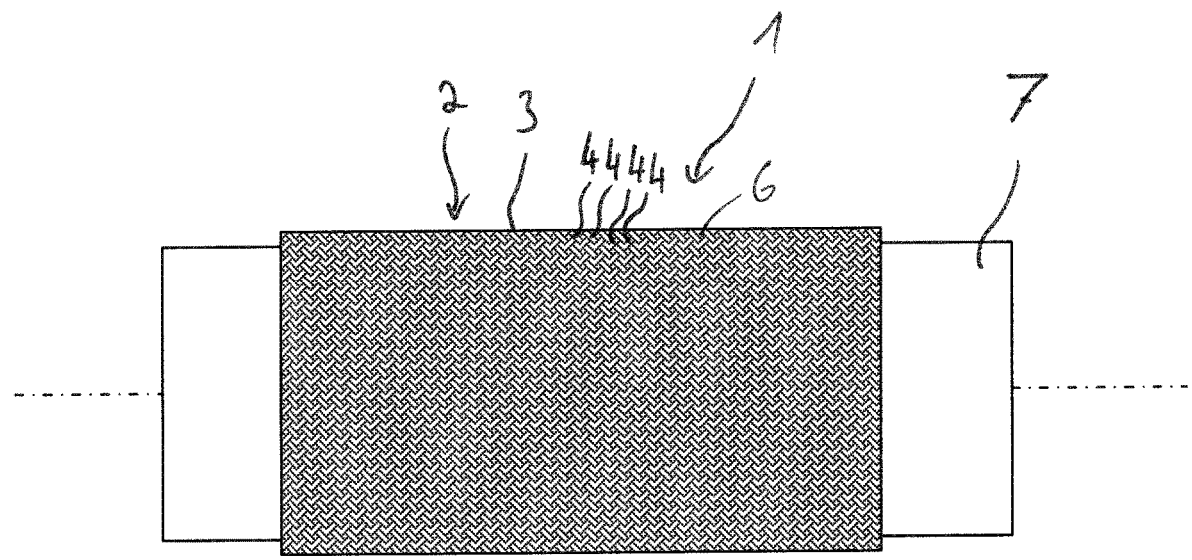
Fig. 1
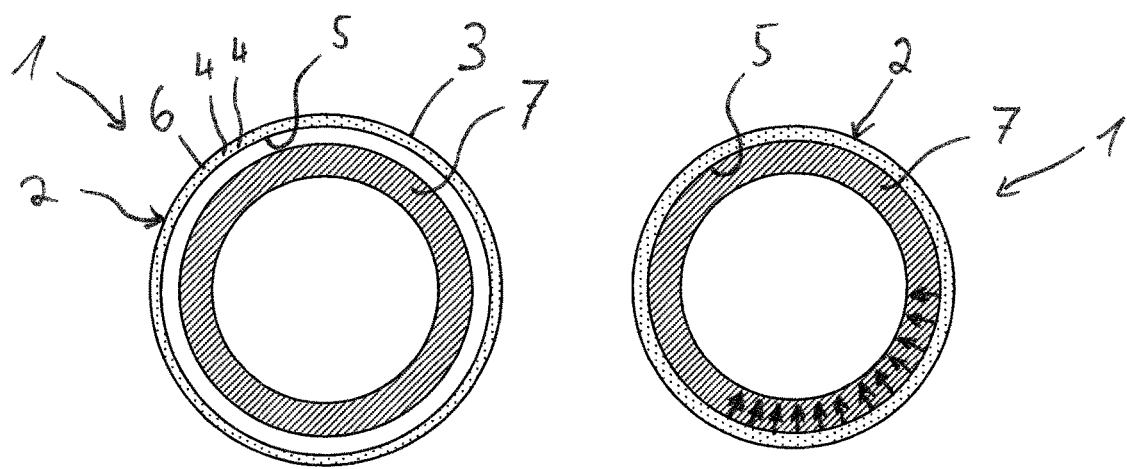
Fig. 2A      Fig. 2B

REINFORCING ELEMENT FOR A STRUCTURAL PROFILE, STRUCTURAL ARRANGEMENT, AIRCRAFT OR SPACECRAFT AND METHOD FOR PRODUCING A STRUCTURAL ARRANGEMENT

CROSS-REFERENCES TO RELATED APPLICATIONS

This application claims the benefit of the German patent application No. 10 2018 218 039.3 filed on Oct. 22, 2018, the entire disclosures of which are incorporated herein by way of reference.

FIELD OF THE INVENTION

The present invention relates to a reinforcing element for a structural profile, a structural arrangement, in particular for an aircraft or spacecraft, with such a reinforcing element, an aircraft or spacecraft with such a structural arrangement as well as a method for producing such a structural arrangement.

BACKGROUND OF THE INVENTION

In aeronautics, tubes are used as structural profiles for local absorbance of axial loads as a result of their high resistance to bending. DE 10 2008 041 230 A1 describes the attachment of a line to a traverse, which is formed with a tube, by means of holders. The attachment of the tube to a fuselage structure by means of holders is further described. For this purpose, the tube has a plurality of transverse bores which are incorporated in a bore grid and provided for positive-locking axial securing of the holders. The holders have transverse webs with pins which correspond to the bores and which are incorporated in a positive-locking manner into the bores.

SUMMARY OF THE INVENTION

Against this background, an object on which the present invention is based is to create a reinforcing element which enables improved bonding to a structural profile, in particular to a tube.

A reinforcing element for a structural profile, in particular for a round, oval or elliptical structural tube, is accordingly provided. The reinforcing element comprises: a fiber structure which has a hollow-cylindrical, helically wound mesh of fiber strands and forms an inner shell surface formed to receive the structural profile; and a matrix material into which the fiber strands are respectively embedded and which is formed to be shrinkable by heating so that the fiber structure can be fastened to the structural profile with the inner shell surface by heating the matrix material.

A structural arrangement, in particular for an aircraft or spacecraft, is furthermore provided. The structural arrangement comprises: a round, oval or elliptical structural profile, in particular structural tube; and a reinforcing element according to the invention which locally surrounds the structural profile, wherein the matrix material of the reinforcing element is shrunk for the application of a tensile stress and in this manner is frictionally connected to the structural profile.

An aircraft or spacecraft is furthermore provided, with a structural arrangement according to the invention, wherein the structural profile is formed as a structural tube bound on a primary structure of the aircraft or spacecraft for binding at least one component on the primary structure.

A method for producing a structural arrangement, in particular a structural arrangement according to the invention and/or for a or in an aircraft or spacecraft according to the invention, is provided, with the steps: arrangement of an unshrunk reinforcing element according to the invention on a structural profile in such a manner that the inner shell surface locally surrounds the structural profile; performing a tolerance equalization by displacing the reinforcing element along the structural profile into a final position: and heating the reinforcing element for fastening the inner shell surface to the structural profile by shrinking the matrix material.

The invention is based on the knowledge that the bending rigidity of a profile, in particular of a tube, is increased by an external compressive force.

An idea on which the present invention is based is to use the principles of the modes of operation of what are known as extension sleeves, also referred to as finger traps, which taper under tensile load, and what are known as shrink hoses, which significantly contract under the action of heat, in a synergistic manner for reinforcement or crash-safe introduction of load for structural profiles, in particular structural tubes, in the aircraft and spacecraft sector.

According to the invention, for this purpose, on one hand, a thermoelastically shrinkable matrix material is used, in particular a thermoplastic matrix material, and combined with a helically wound mesh of fiber strands which radially contract during tensile loading. The fiber strands are embedded respectively in the matrix material for this purpose. The reinforcing element is hollow in the center so that a sleeve provided for pushing or threading onto a structural profile is created which can be frictionally fastened to the structural profile by heating and reinforces the structural profile by means of the pressure applied in this manner.

In the case of one embodiment, the structural profile can also have a formation which brings about a certain positive-locking fastening of the shrunk reinforcing element. For example, elevations can be provided regularly or irregularly or locally on the outer surface of the structural profile, around which surface the reinforcing element is placed during shrinking and thus engages behind it in the axial direction.

According to the invention, a two-stage frictional fastening is achieved. On one hand, a shrinking of the matrix material achieved by heating represents a circumferential pressure on the structural profile and thus a frictional connection between the inner shell surface and the outer surface of the structural profile. In the case of increasing tensile loading, however, the pressure and thus the frictional connection are additionally amplified by the radial contraction of the mesh. In this manner, the properties of the reinforcing element according to the invention can be adjusted such that an action which is advantageous in several aspects for the binding of axial loads is achieved.

On one hand, the structural profile is already reinforced locally in terms of its bending rigidity with the pressure applied by the shrinking. A frictional connection which is adequate for a fastening of a force introduction element provided for axial loads under normal loads, in particular flight loads, is also created. The fiber structure additionally applies with its mesh upon the occurrence of a tensile force which exceeds the normal level, in particular overloads which occur in the event of crash, an additional very significant pressure as a result of the retraction of the fabric which in a self-helping manner temporarily significantly increases on one hand the bending rigidity of the structural profile and also temporarily massively reinforces the frictional connection. This enables an entirely new configuration during binding for the absorbance of axial loads on structural profiles.

On one hand, structural profiles, in particular structural tubes, can have smaller or thinner dimensions as a result of the locally adjustable, additional stiffening. Moreover, recesses, such as bores or the like, in the tubes are avoided according to the invention so that not only the rigidity but also the strength of the structure are improved. A significant reduction in weight can therefore be achieved overall.

According to the invention, there is furthermore advantageously complete freedom in terms of positioning without a preparation of the structural profile being required for this purpose. In particular, the unshrunk state of the reinforcing element can be used for simple tolerance-equalizing mounting and free axial positioning of the reinforcing element. Measures for tolerance equalization such as threaded sleeves or the like thus become superfluous during mounting. By smart selection of the mounting sequence and heating of the reinforcing elements only at the end of mounting if a final positioning of the components to be bound is produced, the fastening can still be subsequently fastened only by heating, i.e., where applicable even in the case of poor accessibility of the binding points in the mounted state. For example, a heat radiator which acts circumferentially around the adjustment element can be used for this purpose.

Moreover, the reinforcing element can be integrated by its thermoplastic matrix ideally in thermoplastic fiber composite manners on which there is an ever increasing focus in the aerospace sector.

According to one embodiment, each fiber strand is embedded individually into the matrix material. In this manner, a composite thread is formed with each fiber strand. A fiber strand can have a plurality of parallel fibers and/or a plurality of fiber bundles. The mesh is correspondingly formed as a mesh of such composite threads. The composite threads correspondingly form the hollow-cylindrical, helically wound mesh. In this manner, easy sliding of the composite threads on one another is advantageously enabled so that the mesh can contract with less resistance or more easily. The sliding properties can furthermore be adjusted, for example, by downstream consolidation steps of differing intensities, so that an engagement threshold for the contracting action of the mesh can be predetermined.

According to a further embodiment, the mesh of fiber strands is embedded jointly into the matrix material. Initially, a mesh of fiber strands is correspondingly formed, which mesh is subsequently embedded, in particular fully, into the matrix material. In this manner, a larger active material cross-section of the matrix material is provided. A tensile force which can be applied by shrinking and thus a pressure on the structural profile which can be achieved by shrinking can thus advantageously be increased.

According to one embodiment, the reinforcing element is formed and arranged for stiffening the structural profile. In particular, the reinforcing element is provided for local bending stiffening. It is accordingly fitted in those regions at which a bending out of the structural profile is to be expected in particular as a function of the prevailing Euler's case of bearing of the structural profile. It would also be conceivable to provide the reinforcing element continuously between the bearing points of the structural profile and thus continuously increase the bending rigidity.

According to one embodiment, the reinforcing element is formed and arranged for introduction of axial loads into the structural profile. In this manner, the pressure applied for the frictional connection can be used to support loads. Moreover, the axial loads can be applied as tensile load on the reinforcing element so that the mesh contracts from a predetermined tensile stress. In the case of a tensile load which lengthens the reinforcing element, the mesh can thus be used synergistically for additional temporary stiffening of the structural profile and for additional temporary reinforcing of the frictional connection.

According to a further development, the reinforcing element has a receiver which is coupled to the fiber structure and which is formed to transmit axial loads to the fiber structure. The receiver, at least parts of the receiver, is preferably formed in one piece with the reinforcing element. This can be a receiver which can subsequently be attached to the reinforcing element. The receiver can be formed in multiple parts.

According to a further development, the receiver is provided coupled to the fiber structure in a firmly bonded manner via the matrix material. In particular, the receiver can be embedded jointly with the fiber structure into the matrix material or shaped by the matrix material. In the case of a subsequently attached receiver, this can also be welded on via the matrix material which is thermoplastic. A secure binding of the receiver on the fiber structure is advantageously ensured with the firmly bonded coupling.

According to one embodiment, the fiber structure is configured such that the mesh of fiber strands axially lengthens and radially contracts in the case of axial tensile loading so that the frictional connection is automatically strengthened with the structural profile. This is achieved in particular by the hollow-cylindrical, helically wound structure of the mesh. This is in particular a biaxial mesh. Such a helical biaxial mesh in no way has axial fiber strands so that the complete tensile force is converted into an axial lengthening and a radial contraction of the mesh.

According to one embodiment of the aircraft or spacecraft, the structural tube is arranged axially on a fuselage structure of the aircraft or spacecraft. In this manner, axial loads of components, both conventional flight loads and also crash loads, can be supported on the structural tube. For example, galleys, on-board toilets or other cabin monuments are possible as such axially supportable components. An on one hand easily mountable tolerance-equalizing support is thus advantageously created which also offers easy parallel line guidance and a high level of crash safety.

According to one embodiment, the at least one component is bound via the reinforcing element on the structural tube. Alternatively or additionally, the structural tube can also be bound via the reinforcing element on the primary structure. The reinforcing element is thus suitable both for connection of the structural tube to a component or secondary structure to be bound and for binding the structural tube on a primary structure, in particular an aircraft fuselage structure. Simple mounting can thus advantageously be planned in a simplified manner. In particular, all tolerance-equalizing working steps are superfluous.

For the purpose of binding the component via the reinforcing element on the structural tube, the component is articulated on the reinforcing element in its installation situation and only subsequently heats the reinforcing element which binds the components for the purpose of fastening.

For binding of the structural tube via the reinforcing element on the primary structure, the structural tube can be easily positioned at all fastening points and subsequently the reinforcing elements which bind the structural tube are heated for the purpose of fastening. Of course, this is also possible in a step-wise manner, for example, from rib to rib of a fuselage.

According to one embodiment, the fiber structure is configured for dimensionally stable transmission of conventional flight loads by the frictional connection applied with the shrinking of the matrix material to the structural tube. No deformation correspondingly also occurs without extraordinary loads so that the fabric is yet to contract or contracts only reversibly in the case of conventional loads and the matrix material does not deform or only deforms reversibly or elastically. A high degree of strength is thus advantageously ensured.

According to a further development, the fiber structure is configured for shape-changing transmission of axial overloads to the structural profile by axial lengthening and radial contraction. Such overloads can be in particular crash loads. In this manner, the reinforcing element contributes to a bending rigidity of the connection arrangement in the event of overload which still temporarily goes significantly beyond the bending rigidity achieved originally by the shrinking, in particular in the event of a crash, and also ensures secure fastening in this case of overload as a result of a temporarily reinforced frictional connection.

According to one embodiment of the method according to the invention, the reinforcing element is formed for binding a component on the structural profile, wherein performing the tolerance equalization comprises coupling the component to the reinforcing element and a final positioning of the component in its installation position so that the component is bound on the structural profile by heating the reinforcing element in the installation position. In this manner, no additional operating step is advantageously required for the purpose of tolerance equalization. On the contrary, tolerance equalization is automatically achieved as a result of a smart change in the sequence of normal mounting steps which is enabled by the reinforcing element according to the invention.

The above configurations and further developments can be combined, where expedient, as desired with one another. Further possible configurations, further developments and implementations of the invention also comprise non-explicitly cited combinations of features of the invention described above and below in relation to the exemplary embodiments. In particular, the person skilled in the art will also add individual aspects as improvements or additions to the respective basic form of the present invention.

BRIEF DESCRIPTION OF THE DRAWINGS

The present invention is explained in greater detail below on the basis of the exemplary embodiments indicated in the schematic figures. In the figures:

FIG. 1 shows a top view of a reinforcing element which is applied onto a structural profile;

FIG. 2A shows a cross-sectional view of the reinforcing element and structural profile according to FIG. 1 in an unshrunk state;

FIG. 2B shows a cross-sectional view of the reinforcing element and structural profile according to FIGS. 1 and 2A in a shrunk state;

Figure 3:
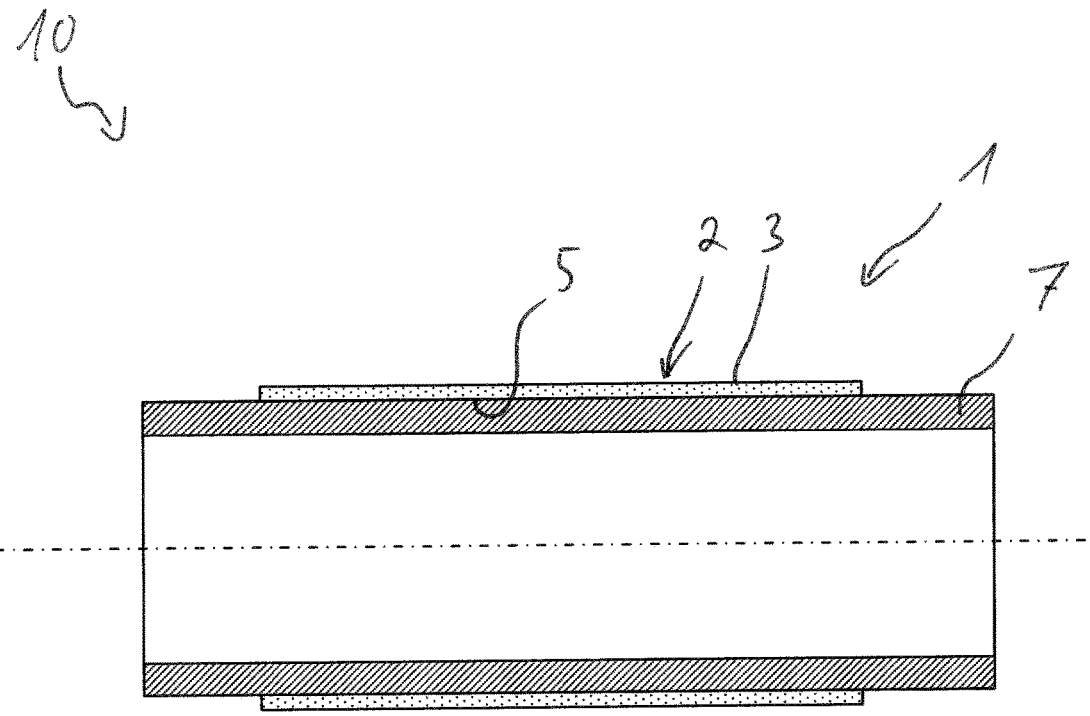
FIG. 3 shows a longitudinal sectional view of a structural arrangement.

The enclosed figures are intended to communicate further understanding of the embodiments of the invention. They illustrate embodiments and serve, together with the description, to explain principles and concepts of the invention. Other embodiments and many of the stated advantages arise in relation to the drawings. The elements of the drawing are not necessarily shown true-to-scale in relation to one another.

Elements, features and components which are identical, have the same function and act in the same manner, unless indicated otherwise, are provided in each case with the same reference numbers in the figures of the drawing.

DETAILED DESCRIPTION OF THE PREFERRED EMBODIMENTS

FIG. 1 shows a top view of a reinforcing element 1 which is applied onto a structural profile 7.

Reinforcing element 1 is formed to be hollow-cylindrical and provided for reinforcement of structural profile 7, to which end it is pushed thereon. Reinforcing element 1 is formed with a fiber structure 2 and a matrix material 6. Fiber structure 2 contains a hollow-cylindrical, helically wound mesh 3 of fiber strands 4 and thus forms an inner shell surface 5 formed to receive structural profile 7. Fiber strands 4 are embedded in each case into matrix material 6.

In the case of the represented embodiment, each fiber strand 4 is embedded individually into matrix material 6. In this manner, a plurality of composite threads are provided, wherein the mesh is formed as a mesh, which is apparent from the outside, of such composite threads.

In the case of further embodiments, mesh 3 of fiber strands 4 can also be embedded jointly into matrix material 6, for example, by infiltration of a dry mesh 3 of fiber strands 4 with matrix material 6.

The matrix material is formed to be shrinkable by heating. This is a thermoplastic material which can be shrunk by heat. In this manner, fiber structure 2 can be fastened to the structural profile by heating matrix material 6 with inner shell surface 5 in that it applies a circumferential tensile force during shrinking.

FIG. 2A shows a cross-sectional view of reinforcing element 1 and structural profile 7 according to FIG. 1 in an unshrunk state.

As is apparent in this cross-sectional view, the structural profile is, for example, a round tube. Of course, other profile cross-sections are possible in the case of further embodiments.

Reinforcing element 1 is, in the unshrunk state represented here, applied with predetermined play onto structural profile 7 so that it surrounds structural profile 7 and is displaceable in the axial direction. A space or a clearance is correspondingly provided at least in portions between inner shell surface 5 of fiber structure 2 and an outer surface of structural profile 7 which ensures easy displaceability. The concentric arrangement represented here with a comparatively large intermediate space between structural profile 7 and reinforcing element 1 is to be understood as purely illustrative. Play can, in actual fact, also be provided to be comparatively small. This can be, in particular, a clearance fit which, however, also allows easy displaceability of the reinforcing element along structural profile 7.

FIG. 2B shows a cross-sectional view of reinforcing element 1 and structural profile 7 according to FIGS. 1 and 2A in a shrunk state.

This shrunk state is achieved by heating reinforcing element 1, wherein matrix material 6 contracts significantly and thus generates a circumferential tensile force. In this manner, a superficial pressure is generated around entire structural profile 7 as symbolized by the arrows plotted on inner shell surface 5.

The uniform pressure on structural profile 7 leads, on one hand, to a frictional connection between reinforcing element 1 and structural profile 7 so that reinforcing element 1 is fastened to structural profile 7 by shrinking. The circumferentially applied pressure additionally increases the bending rigidity of structural profile 7.

FIG. 3 shows a longitudinal sectional view of a structural arrangement 10 with reinforcing element 1 and structural profile 7 according to FIG. 2B.

Such a structural arrangement 10 is used, for example, for an aircraft or spacecraft to support x loads, i.e., loads acting in the direction of flight. A structural profile 7 can be formed in a different manner depending on the structure of such an aircraft or spacecraft. Of course, this can be a metal profile, but it would also be conceivable to provide a fiber composite profile.

The represented embodiment involves a hollow profile cross-section. The structural profile is correspondingly a tube. Such profile cross-sections advantageously have high bending rigidities which are advantageous in particular for directed load support. A solid structural profile 7 would, however, also be conceivable in the case of further embodiments.

Structural profile 7 is locally surrounded by reinforcing element 1, as is described in relation to FIGS. 1 and 2A, 2B. Matrix material 6 of reinforcing element 1 is shrunk for the application of a tensile stress. In this manner, a frictional connection is produced between reinforcing element 1 and structural profile 7 and a local circumferential pressure is applied on structural profile 7.

In the case of the represented embodiment, reinforcing element 1 is formed and arranged for local bending stiffening of structural profile 7. The structural arrangement correspondingly has an increased bending rigidity in the region of the reinforcing element as a result of the applied pressure.

Figure 4:
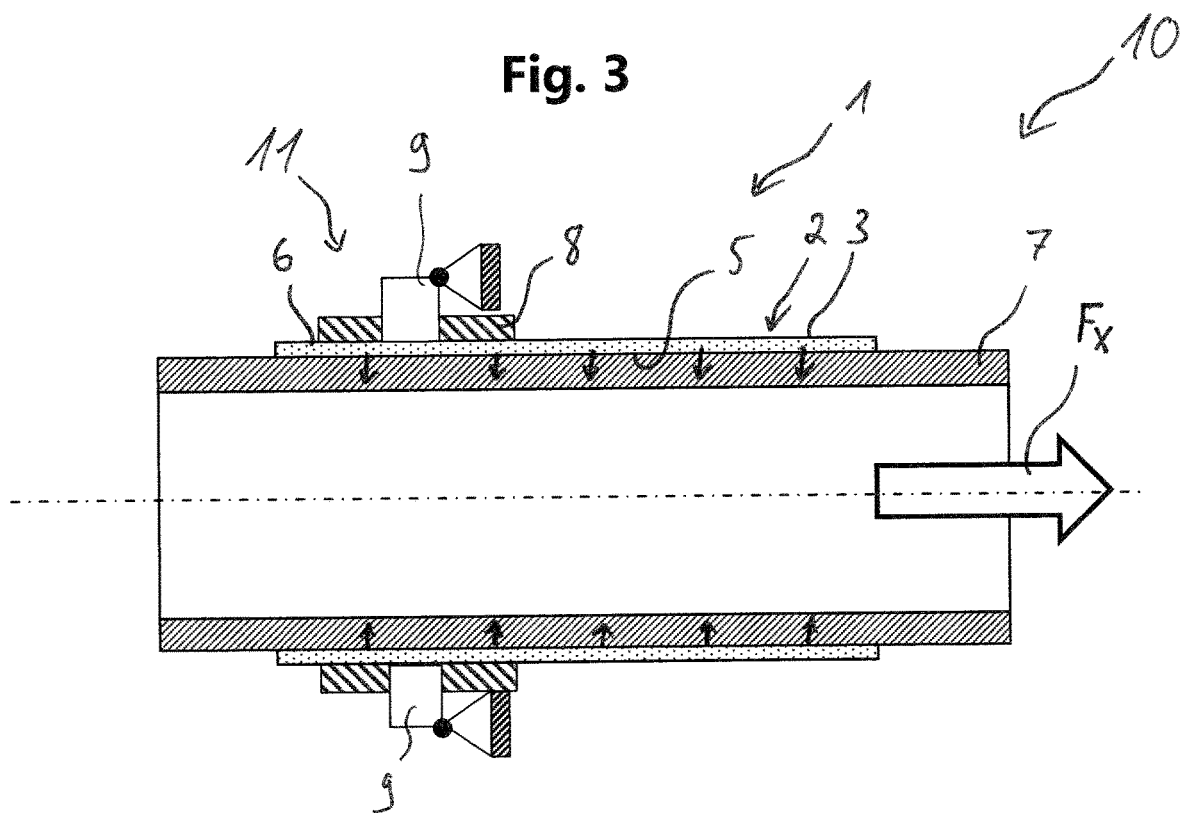
FIG. 4 shows a longitudinal sectional view of a structural arrangement according to a further embodiment.

FIG. 4 shows a longitudinal sectional view of a structural arrangement 10 according to a further embodiment.

In addition to the bending stiffening action, reinforcing element 1 is also formed here for the introduction of axial loads into structural profile 7. To this end, reinforcing element 1 has a receiver 11 which is coupled to fiber structure 2 and which is formed for the transmission of axial loads, which are symbolized here by an arrow Fx, to fiber structure 2.

Receiver 11 comprises, on one hand, a bracket 8 which engages around fiber structure 2 in the region of a longitudinal side end of fiber structure 2. Bracket 8 is preferably an uninterrupted sleeve-like bracket 8. In the case of further embodiments, however, it would also be conceivable to provide, in particular, an interrupted bracket 8 upon which a pretensioning acts.

Bracket 8 is connected circumferentially to fiber structure 2. Both positive-locking and firmly bonded connections are conceivable for this purpose.

In the case of the represented embodiment, bracket 8 is formed from a thermoplastic material. In particular, bracket 8 is formed with the same thermoplastic material as matrix material 6 or with a material which can be welded thereto. In this manner, receiver 11 is coupled or can be coupled in a firmly bonded manner via matrix material 6 to fiber structure 2. For example, bracket 8 is formed integrated with reinforcing element 1. For this purpose, in the event of a fabric 3 jointly embedded into matrix material 6, it can already be embedded during production. Otherwise, bracket 8 can be provided welded subsequently to the matrix material.

Bracket 8 has one or more force introduction elements 9. The represented embodiment involves two oppositely arranged articulation points which, in each case, allow bearing with at least one rotational degree of freedom. This can involve, in particular, a bolt bearing. Dual axis bearings or ball joint bearings are, however, also conceivable. In this manner, the transmission of torques to structural profile 7 is avoided, thus the directed support of axial loads symbolized here by an arrow Fx is ensured via force-introduction elements 9.

If a tensile force Fx is applied on fiber structure 2 via such a force introduction element 9, this is initially transmitted via shrunk matrix material 6 to structural profile 7. The reinforcing element is preferably configured in such a manner that the normal operating loads can be transmitted in this manner, in particular, flight loads in the case of an aircraft or spacecraft. Fiber structure 2 is correspondingly configured for dimensionally stable transmission of conventional flight loads by the frictional connection applied with the shrinking of matrix material 6 to the structural tube.

However, if excessive loads occur, for example, in the event of a crash, the particular functionality of mesh 3 is brought to bear. Fiber structure 2 is configured in such a manner that, in the case of excessive axial tensile loading Fx, mesh 3 of fiber strands 4 axially lengthens and radially contracts so that an additional pressure is applied on the structural profile and the frictional connection to structural profile 7 is automatically strengthened. Fiber structure 2 is correspondingly configured for shape-changing transmission of axial overloads Fx, in particular crash loads, to the structural profile by axial lengthening and radial contraction.

For this purpose, for example, mesh 3 is formed as a biaxial helical mesh without fibers in the x direction, which represents, in particular, the flight direction. Such a mesh 3 is able to lengthen in the case of a tensile force and simultaneously reduce its diameter or radially contract. By means of embedding in the matrix material, a configuration is enabled which allows this mechanism to come to bear at a predetermined tensile force threshold, in particular only in the case of excessive load.

The pressure which additionally acts in the case of engagement of an excessive tensile force Fx on structural profile 7 is illustrated here with further arrows engaging on inner shell surface 5. In this manner, on one hand, the fastening by frictional connection is strengthened and furthermore the local bending rigidity of structural profile 7 is once again additionally increased. This thus involves a self-helping formation and configuration of the reinforcing element since it is able to automatically increase the holding forces and also the stiffening forces under higher loading.

Figure 5:
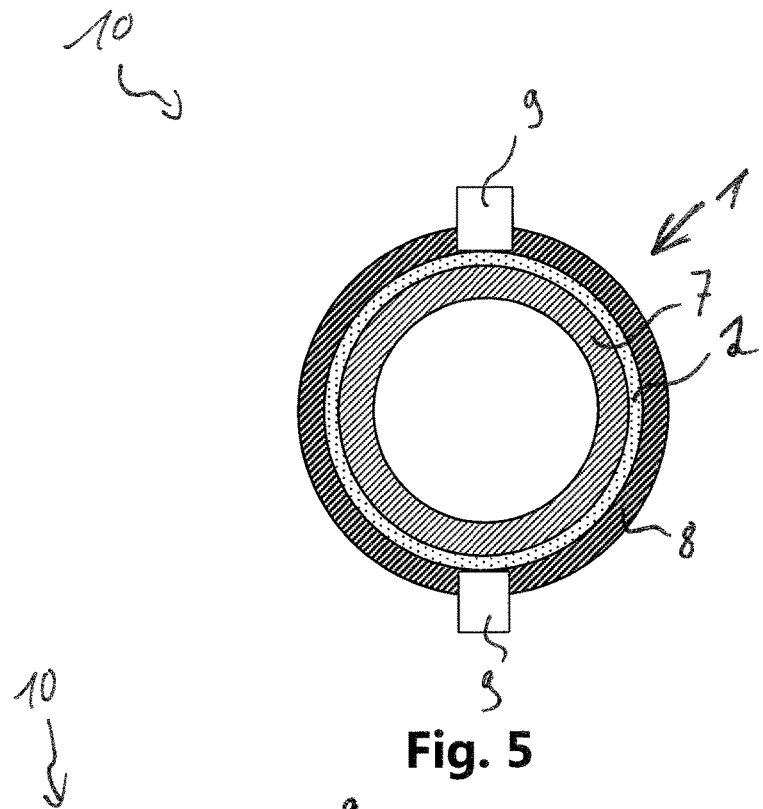
FIG. 5 shows a cross-sectional view of the structural arrangement according to FIG. 4.

FIG. 5 shows a cross-sectional view of structural arrangement 10 according to FIG. 4.

Bracket 8 is clearly formed to be circumferential here. Force introduction elements 9 are received at two opposite points in a recess of bracket 8, for example, in a positive-locking manner. In the case of further embodiments, an integral formation of force introduction elements 9 with bracket 8 would also be conceivable. In particular, force introduction elements 9 can also be provided partially embedded into bracket 8.

Figure 6:
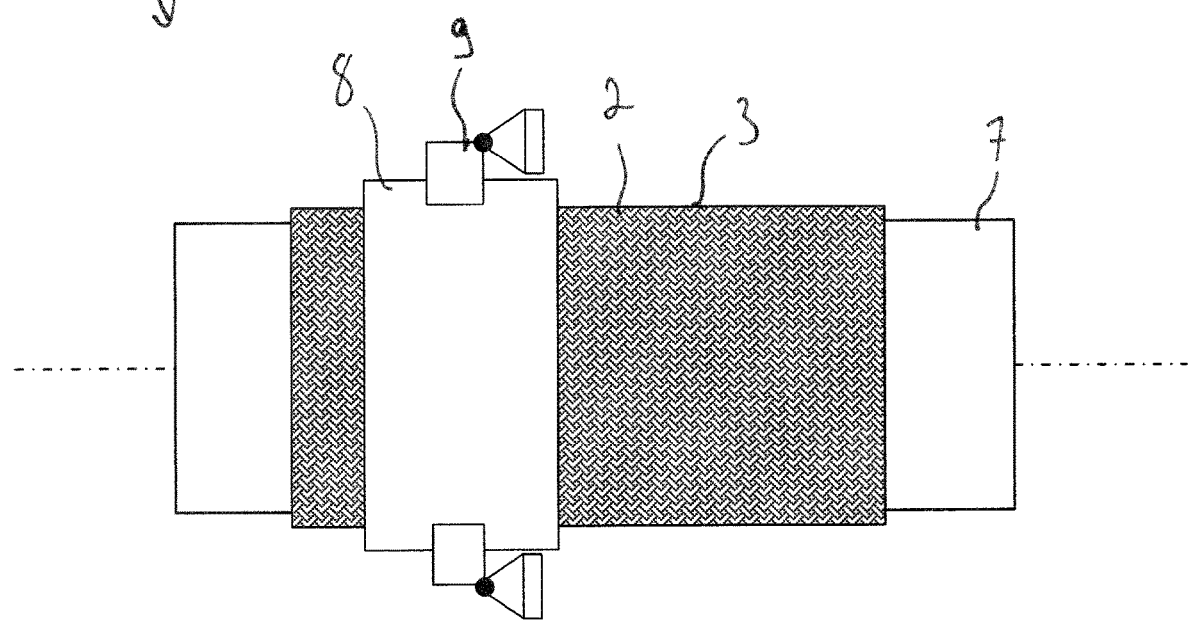
FIG. 6 shows a top view of the structural arrangement according to FIGS. 4 and 5.

FIG. 6 shows a top view of structural arrangement 10 according to FIGS. 4 and 5.

In this view, the circumferential formation of bracket 8 is once again apparent. The helically wound structure of fabric 3 of fiber structure 2 is furthermore apparent from FIG. 6 and in FIG. 1.

Figure 7:
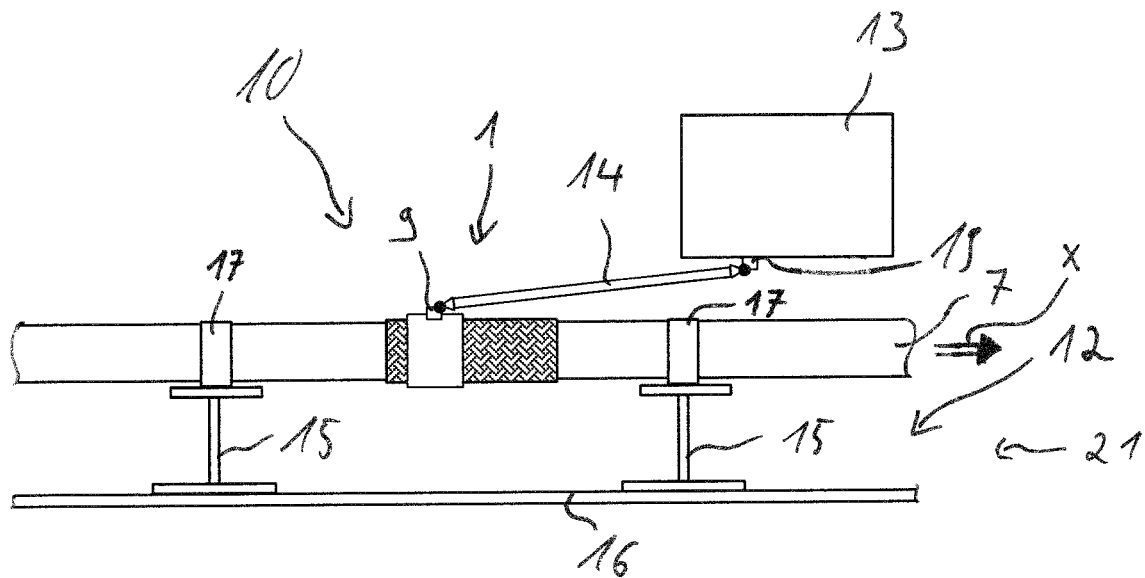
FIG. 7 shows a top view of a structural arrangement according to a further embodiment.

FIG. 7 shows a top view of a structural arrangement 10 according to a further embodiment.

Structural profile 7 is formed here as a structural tube bound on a primary structure 12 of an aircraft or spacecraft. The structural tube is formed for binding a component 13 on primary structure 12 for its support in flight direction x.

Primary structure 12 is represented only schematically here and has purely by way of example several ribs 15 as well as a skin 16 of a fuselage 21 of an aircraft or spacecraft 20. The structural tube runs in flight direction x and is arranged axially on fuselage 21. The structural tube is bound here in each case on rib 15, for example, by means of tube brackets 17.

The structural tube forms with a reinforcing element 1 a structural arrangement 10 as is described substantially in relation to FIGS. 4 to 6. A Samer rod 14 is articulated with one end to at least one force introduction element 9 of reinforcing element 1, which Samer rod 14 is articulated with its other end via a force transmission element 19 to component 13. In this manner, component 13 is bound via reinforcing element 1 to the structural tube and thus provides an axial support in the x-direction for component 13.

Such a component 13 can be, for example, a cabin element which is supported in this manner in flight direction x. For example, a galley, an on-board toilet or another cabin monument can be provided as component 13.

Particularly simple mounting of such components 13 can particularly advantageously be realized in this manner A method for producing such a structural arrangement 10 can be performed with the steps of arranging an unshrunk reinforcing element 1 on structural profile 7 in such a manner that inner shell surface 5 locally surrounds structural profile 7; performing a tolerance equalization by displacing reinforcing element 1 along structural profile 7 into a final position; and heating reinforcing element 1 for fastening inner shell surface 5 to structural profile 7 by shrinking matrix material 6.

For binding component 13 on structural profile 7, the performance of the tolerance equalization comprises coupling component 13 to reinforcing element 1 and a final positioning of component 13 in its installation position. The reinforcing element can be axially freely displaced for this purpose. Component 13 can subsequently be bound on structural profile 7 by heating reinforcing element 1 in the installation position. In this manner, no additional tolerance-equalizing measures such as floating bearings or the like are advantageously necessary.

Figure 8:
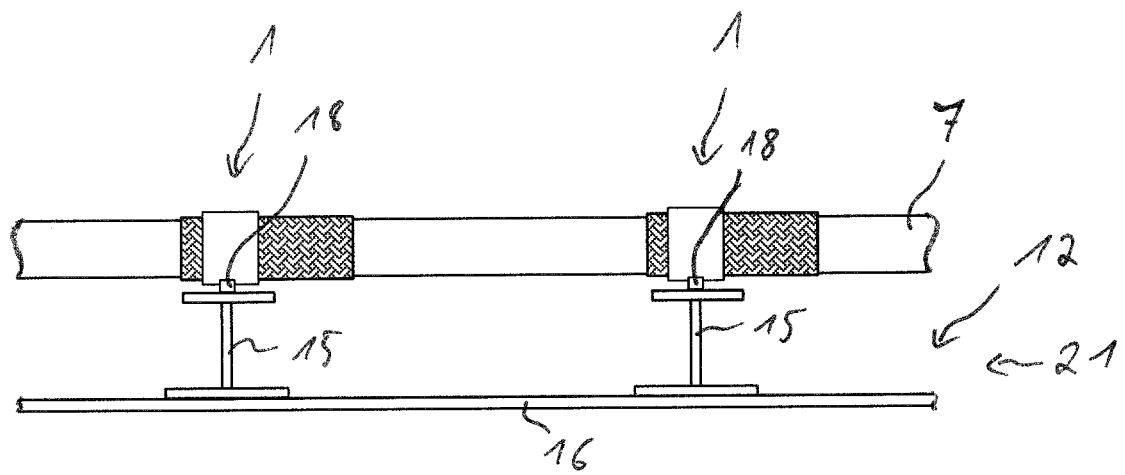
FIG. 8 shows a top view of a structural arrangement according to a yet further embodiment.

FIG. 8 shows a top view of a structural arrangement 10 according to a yet further embodiment.

In the case of this embodiment, a reinforcing element 1 is also provided, wherein this is provided here for binding of the structural tube on primary structure 12. Instead of articulated force-introduction elements 9, sockets 18 fastened with ribs 15 are provided here which are fastened with bracket 8. In the unshrunk state, the structural tube pushed into reinforcing elements 1 can be axially freely displaced therein.

The method for producing structural arrangement 10 runs here substantially identically to the manner described in relation to FIG. 7 with the difference that the structural profile is freely movable relative to the reinforcing element for tolerance equalization. Tolerances can thus be equalized here by reinforcing element 1, in particular manufacturing tolerances of primary structure 12. After a final positioning, the structural tube can then be subsequently fastened by heating the reinforcing element. For example, axial manufacturing tolerances of an aircraft fuselage can thus be easily equalized without additional measures.

Of course, this type of binding of the structural tube can be combined with the binding of a component 13 according to FIG. 7. For this purpose, an additional reinforcing element 1 can be provided or where applicable also a reinforcing element 1, which is, in any case, present for binding on primary structure 12, with additional force-introduction elements.

Figure 9:
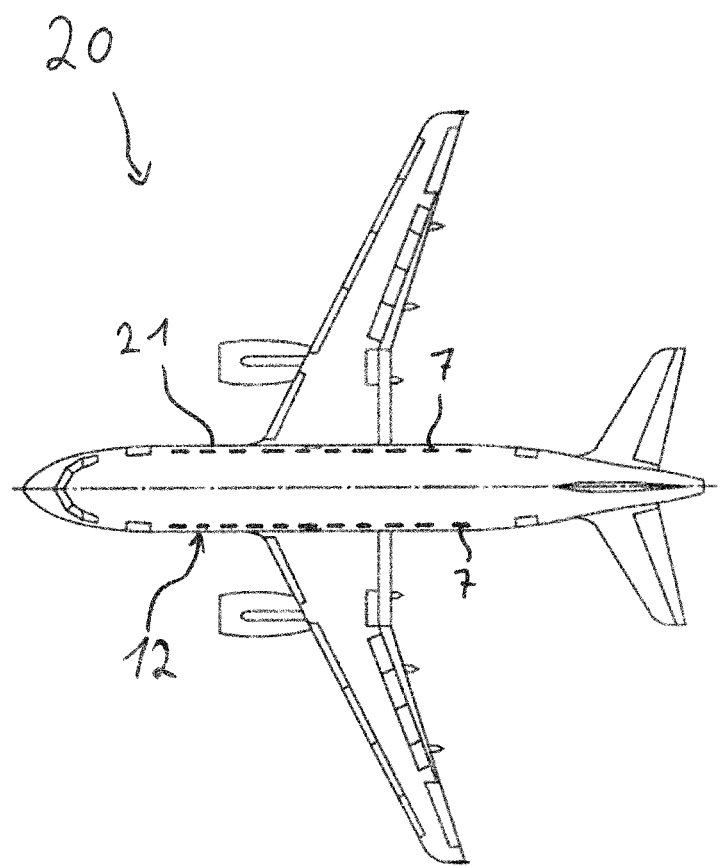
FIG. 9 shows a top view of an aircraft or spacecraft.

FIG. 9 shows a top view of an aircraft or spacecraft 20.

Aircraft or spacecraft 20 has a fuselage 21 which has primary structure 12 described in relation to FIGS. 7 and 8. Structural profile 7 is drawn only schematically with dashed lines in order to illustrate the axial profile, which structural profile 7 is bound on primary structure 12. The binding on primary structure 12 can be formed in particular according to FIG. 8. Structural profile 7 has been provided as components 13 in axial direction x to support cabin elements such as galleys, on-board toilets or other cabin monuments, and formed as a structural tube reinforced by reinforcing element 1.

Although the present invention has been described above entirely on the basis of preferred exemplary embodiments, it is not restricted hereto, rather can be modified in various manners.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE NUMBERS

1 Reinforcing element
2 Fiber structure
3 Mesh
4 Fiber strand
5 Inner shell surface
6 Matrix material
7 Structural profile
8 Bracket
9 Force introduction element
10 Structural arrangement
11 Receiver
12 Primary structure
13 Component
14 Samer rod 15 Rib
16 Skin
17 Tube bracket
18 Socket
19 Force transmission element
20 Aircraft or spacecraft
21 Fuselage

The invention claimed is:

1. A structural arrangement, comprising:
   a round, oval or elliptical structural profile; and
   a reinforcing element which locally surrounds the structural profile, wherein the reinforcing element comprises:
      a fiber structure having a hollow-cylindrical, helically wound mesh of fiber strands and forming an inner shell surface formed to receive the structural profile; and
      a matrix material into which the fiber strands are respectively embedded and which is formed to be shrinkable by heating so that the fiber structure can be fastened to the structural profile with the inner shell surface by heating the matrix material
   wherein the matrix material of the reinforcing element is shrunk for an application of a tensile stress and in this manner is frictionally connected to the structural profile,
   wherein the reinforcing element has a receiver which is coupled to the fiber structure and which is formed to transmit axial loads onto the fiber structure.

2. The structural arrangement according to claim 1, wherein the structural profile comprises a round, oval or elliptical structural tube.

3. The structural arrangement according to claim 1, wherein the mesh of fiber strands is embedded jointly into the matrix material, or wherein each fiber strand is embedded individually into the matrix material and thus forms a composite thread, wherein the mesh is formed as a mesh of composite threads.

4. The structural arrangement according to claim 1, wherein the round, oval or elliptical structural profile comprises a structural tube.

5. The structural arrangement according to claim 1, wherein the reinforcing element is formed and arranged for stiffening the structural profile.

6. The structural arrangement according to claim 5, wherein the reinforcing element is formed and arranged for local bending stiffening of the structural profile.

7. The structural arrangement according to claim 1, wherein the receiver is provided coupled in a firmly bonded manner via the matrix material to the fiber structure.

8. The structural arrangement according to claim 7, wherein the receiver is embedded in the matrix material or welded thereto.

9. The structural arrangement according to claim 1, wherein the fiber structure is configured such that the mesh of fiber strands axially lengthens and radially contracts during axial tensile loading so that a frictional connection with the structural profile is automatically strengthened.

10. An aircraft or spacecraft, with a structural arrangement according to claim 1, wherein the structural profile is formed as a structural tube bound on a primary structure of the aircraft or spacecraft for binding at least one component on the primary structure.

11. The aircraft or spacecraft according to claim 10, wherein the structural tube is arranged axially on a fuselage structure of the aircraft or spacecraft.

12. The aircraft or spacecraft according to claim 10, wherein at least one of the at least one component is bound via the reinforcing element on the structural tube or the structural tube is bound via the reinforcing element on the primary structure.

13. The aircraft or spacecraft according to claim 10, wherein the fiber structure is configured for dimensionally stable transmission of conventional flight loads by a frictional connection applied with the shrinking of the matrix material to the structural tube.

14. The aircraft or spacecraft according to claim 10, wherein the fiber structure is configured for shape-changing transmission of axial overloads, to the structural profile by axial lengthening and radial contraction.

15. The aircraft or spacecraft according to claim 14, wherein said axial overloads comprise crash loads.

16. A method for producing the structural arrangement according to claim 1, comprising the steps:
   arranging the unshrunk reinforcing element on the structural profile in such a manner that the inner shell surface locally surrounds the structural profile;
   performing a tolerance equalization by displacing the reinforcing element along the structural profile into a final position: and
   heating the reinforcing element for fastening the inner shell surface to the structural profile by shrinking the matrix material.

17. The method according to claim 16, wherein the reinforcing element is formed for binding a component on the structural profile, wherein performing the tolerance equalization comprises coupling the component to the reinforcing element and a final positioning of the component in its installation position so that the component is bound on the structural profile by heating the reinforcing element in the installation position.

* * * * *